Nov. 16, 1948.  A. WENNERBERG  2,454,241
WIRE CUTTING APPARATUS
Filed July 12, 1946  2 Sheets-Sheet 1
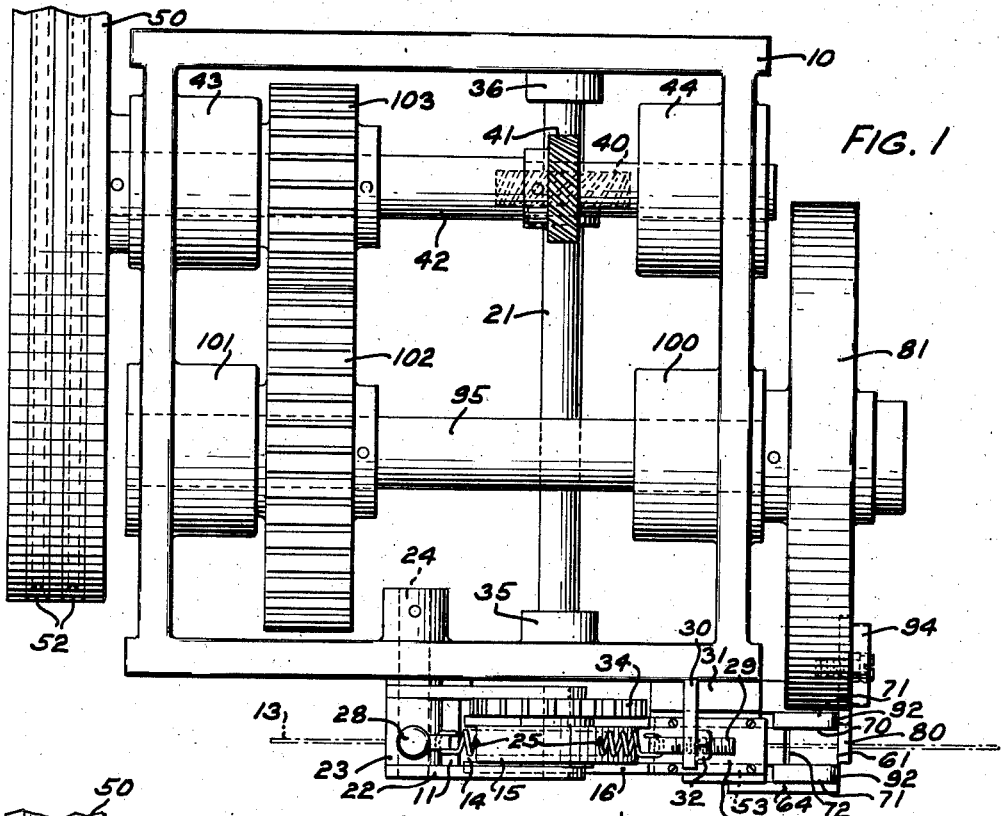
INVENTOR
A. WENNERBERG
BY E.H. Kane
ATTORNEY Nov. 16, 1948.  A. WENNERBERG  2,454,241
WIRE CUTTING APPARATUS
Filed July 12, 1946  2 Sheets-Sheet 2
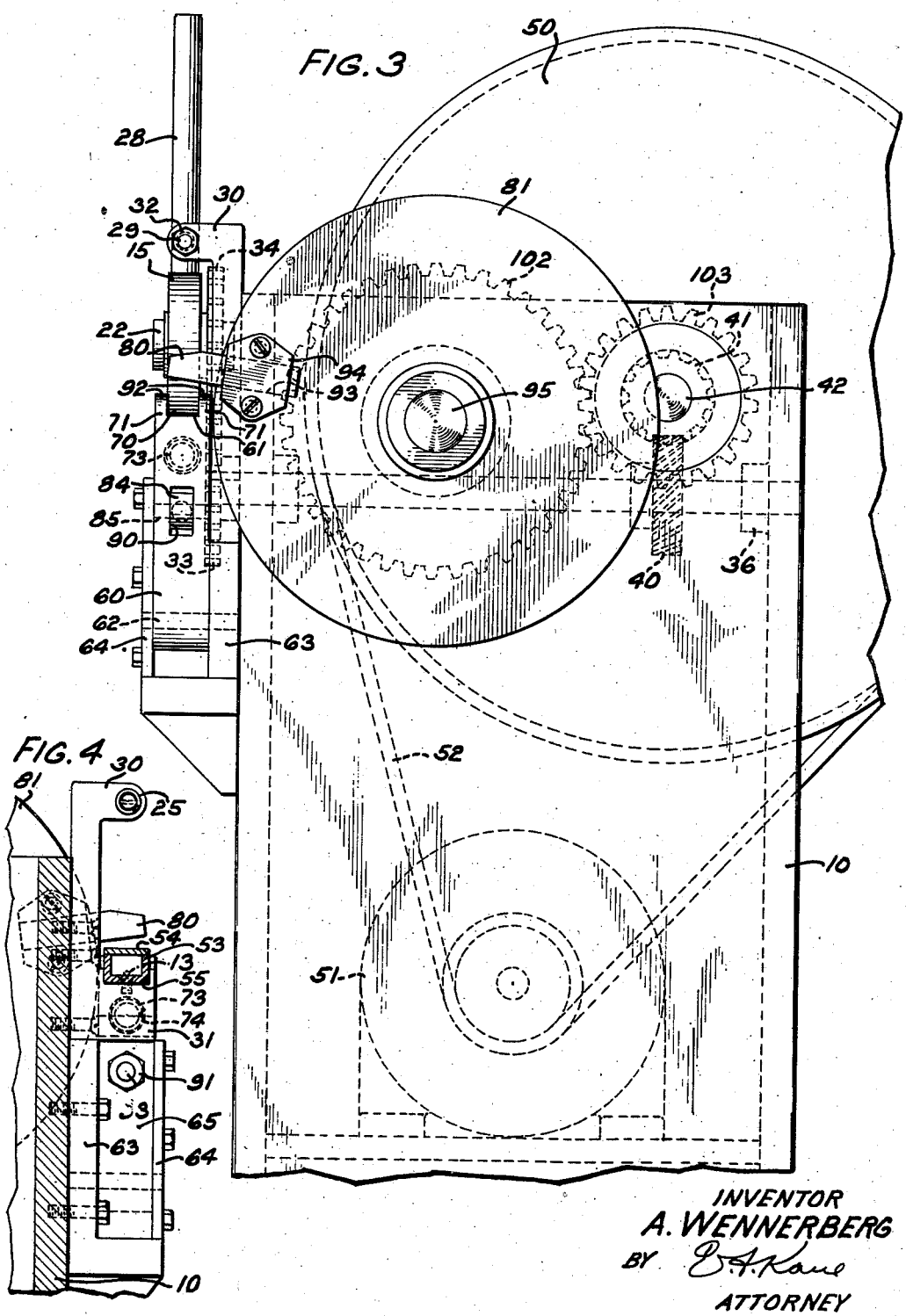
INVENTOR
A. WENNERBERG
BY
ATTORNEY Patented Nov. 16, 1948

2,454,241

UNITED STATES PATENT OFFICE 2,454,241

WIRE-CUTTING APPARATUS

August Wennerberg, Chicago, Ill., assignor to Western Electric Company, Incorporated, New York, N. Y., a corporation of New York Application July 12, 1946, Serial No. 683,041

3 Claims. (Cl. 140—146)

This invention relates to cutting apparatus and more particularly to a wire cutting machine.

An object of this invention is to provide a new and efficient apparatus for cutting wire or strip material into predetermined lengths.

In accordance with one embodiment of this invention, wire or strip material may be cut into predetermined lengths by continuously passing it between a pair of feed rolls which force the emerging wire or strip material into position over a cutting edge formed on a pivoted member that is resiliently urged toward the path of a cutting blade mounted upon and extending radially from a fly wheel rotating in timed relation to the feed rolls and on an axis at right angles to that of the feed rolls and parallel to the path of movement of the wire or strip material. A cam surface on the pivoted member is presented to and engaged by the cutting blade to ensure proper shearing engagement. The cutting edge and the cutting blade engage once during each revolution of the fly wheel and cut a length of wire or strip material during each such engagement as long as the wire or strip is being fed by the feed rolls.

A complete understanding of the invention will be had by reference to the following description taken in conjunction with the accompanying drawings, in which Fig. 1 is a plan view of one embodiment of the invention showing the gear mechanism for driving the blade-carrying flywheel and the feed rolls;

Fig. 2 is a fragmentary front elevation of the apparatus shown in Fig. 1 in which details of the feed roll gears and the pivoted cutting member are more clearly illustrated;

Fig. 3 is a fragmentary side elevation of the apparatus shown in Fig. 1 showing the cutting blade about to engage the cutting edge; and Fig. 4 is a sectional view of the apparatus taken on the line 4—4 of Fig. 2.

As shown in the drawings, the apparatus is provided with a supporting frame member 10 in which the various shaft members are journalled and upon which is secured a block 11 having a guide hole 12 through which wire 13 is fed into the apparatus. The hole 12 extends through an extension 14 of the block 11 which is tapered to fit between a pair of feed rolls 15 and 16 mounted on and keyed to shafts 20 and 21, respectively. The shaft 20 is fixed in the end of a forked arm 22 of a bell crank lever 23 which pivots on a pin 24 fixed to the frame 10. One end of a tension spring 25 is secured to the other arm 28 of the bell crank lever 23 while the other end of the spring is secured to an adjustable bolt 29 threaded into the end of an arm 30 extending from a block 31 secured to the frame 10. The bolt 29 may be locked at any point by a lock nut 32. When the tension of the spring 25 is properly adjusted, the feed roll 15 is resiliently urged against the feed roll 16, contact being made between the peripheral faces of the feed rolls which may be rubber covered to better grip the wire. To prevent lateral escape of wire from between the feed rolls, the feed roll 16 is flanged on both sides, the roll 15 fitting snugly between the flanged sides of the roll 16.

Feed roll 15 is driven by a gear 33 which is fixed to the shaft 21 and meshes with a gear 34 fixed to the shaft 20. Shaft 21, which is journalled in the frame 10 at 35 and 36, is driven through a helical gear 40 meshing with another helical gear 41 fixed upon a main drive shaft 42 journalled in the frame 10 at 43 and 44. It will be apparent that rotation of the shaft 42 will drive the feed rolls 15 and 16 through the gears 41 and 40. Normally the feed rolls rotate in the direction of the arrows 45 and 46. A belt pulley 50 is fixed to one end of the shaft 42 extending out of the framework 10. Power is transmitted to the pulley 50 from a motor 51 by means of belts 52.

In order to guide the wire 13 as it emerges from between the rolls 15 and 16 along a path coaxial with the hole 12 a guide trough 53 having a cover 54 is securely mounted in a channel 55 (Fig. 4) in the block 31.

A relatively stationary cutting member 60 having a shearing edge 61 is pivoted on a pin 62 fixed between an irregularly shaped block 63 and a plate 64 secured to an extension 65 of the block 63. A U-shaped channel 70 is formed in the upper end of cutting member 60, the walls 71 of the channel acting to further guide the wire 13 coming from the guide trough 53. To present an unimpeded path for the wire, the lower left hand edge 72 (Fig. 2) of the channel 70 is rounded whereas the edge at the lower right end of the channel is square cut to form the shearing edge 61. A helical compression spring 73 seated in a recess 74 in the block 31 and abutting an offset face 75 recessed in the upper part of the cutting member 60 resiliently urges the cutting member to the right (Fig. 2) toward the path of a cutting blade 80 mounted on a flywheel 81 and extending substantially radially therefrom. Movement of the cutting member 60 toward the path of the blade 80 is adjustably limited by a nut 82 which is threaded on the shank 83 of a member 84, the other end of which is pivoted on a pin 85 fixed in a slot 90 formed in the cutting member 60.

The nut 82, which may be locked by a nut 91, abuts the left face (Fig. 2) of the extension 65 of the block 63.

Camming surfaces 92 are provided at the upper end of the cutting member 60 and the nut 82 is adjusted so that the upper end of the cutting member projects slightly into the path of the cutting blade 80 which engages the camming surfaces thereby insuring proper shearing engagement between the cutting blade and the shearing edge 61. The blade 80 is seated in a recess 93 formed in the flywheel 81, the cutting edge of the blade extending radially from the center of the wheel. A clamping plate 94 screwed to the flywheel 81 holds the blade 80 securely in place. The fly wheel 81 is fixed to one end of a shaft 95 which is journalled in the frame 10 at 100 and 101 and is rotated by means of a gear 102 mounted on it which meshes with a gear 103 on the drive shaft 42 thereby furnishing driving power to the flywheel.

In operating the apparatus, the wire 13 is inserted into the hole 12 until the wire is engaged by the rotating feed rolls 15 and 16 which may be initially spread apart by a manual pull on the end of the arm 28 of the bell crank lever 23. As the wire emerges from the said rolls it is directed through the guide trough 53 over the shearing edge 61 where it is cut in equal predetermined lengths by the cutting blade 80 which cams the cutting member 60 and engages the cutting edge 61 once in each revolution of the fly wheel 81. The length of the wire which is cut off is determined by many factors, for example, the ratio between the gears 102 and 103; the ratio between the gears 40 and 41; the size of the feed rolls 15 and 16 and the distance between the cutting portion of the blade 80 and the center of the flywheel 81. Changing any one of these factors will change the length of the wire that is cut by the apparatus.

What is claimed is:

1. In a stock cutting apparatus, a cutting blade having a cutting surface, means for moving said blade in a circular path, a pair of feed rolls operable in timed relation to said moving means for moving said stock into the path of said blade, a cutting member having a shearing edge for cooperating with said blade, means for supporting said cutting member for limited movement with respect to the path of said blade, adjustable means for selectively limiting the movement of said cutting member with respect to the path of said blade, resilient means for urging the cutting member toward the path of said blade, a channel in said cutting member having walls for aligning said stock, a channel disposed between said feed rolls and said cutting member having walls for guiding said stock, a flange on one of said feed rolls overlapping the rim of the other of said rolls to retain the stock between said rolls, and a camming surface on said cutting member for engagement by said blade to align the cutting edge of said member with the cutting surface of said blade.

2. A stock cutting apparatus comprising a pair of spring pressed feed rollers for feeding stock along a predetermined path, an oscilable cutting member having a shearing edge disposed across said predetermined path, a flywheel rotating in timed relation to the feed rollers on an axis parallel to the path of movement of said stock, a cutting blade extending radially from said flywheel, means for resiliently urging said cutting member toward the path of said cutting blade, and a camming surface on said cutting member for engagement by said cutting blade to insure proper cooperative shearing engagement between the cutting blade and the shearing edge.

3. A stock cutting apparatus comprising means for feeding stock along a predetermined path, an oscilable cutting member having a shearing edge disposed across said predetermined path, a cutting blade rotatable about a predetermined axis and extending substantially radially from said axis and so disposed that the orbit of the blade crosses said predetermined path, means for imparting rotation to said cutting blade in timed relation to the stock feeding means, means for resiliently urging said cutting member toward the path of said cutting blade and a camming surface on said cutting member for engagement by said cutting blade to insure proper cooperative shearing engagement between the blade and the shearing edge of the cutter.

AUGUST WENNERBERG.

REFERENCES CITED

The following references are of record in the file of this patent:

UNITED STATES PATENTS

| Number | Name | Date |
|---|---|---|
| 121,239 | Fletcher | Nov. 28, 1871 |
| 947,724 | Wood | Jan. 25, 1910 |
| 1,732,224 | Danziger | Oct. 22, 1929 |
| 1,753,894 | Kronmiller | Apr. 8, 1930 |
| 2,007,345 | Roberts | July 9, 1935 |
| 2,121,997 | Tikalsky | June 28, 1938 |
| 2,333,823 | Schliff | Nov. 9, 1943 |